United States Patent
Dalsgaard et al.

(10) Patent No.: US 6,226,527 B1
(45) Date of Patent: May 1, 2001

(54) INTELLIGENT NETWORK SEARCHING FOR A MULTI MODE PHONE

(75) Inventors: Lars Dalsgaard, København K (DK); Marko Kukkohovi, Oulu (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/018,507

(22) Filed: Feb. 4, 1998

(30) Foreign Application Priority Data

Feb. 5, 1997 (GB) .................................................. 9702293

(51) Int. Cl.$^7$ ....................................................... H04B 1/38
(52) U.S. Cl. ........................ 455/553; 455/462; 455/558; 455/552
(58) Field of Search ................................... 455/462, 552, 455/553, 558, 557, 434

(56) References Cited

U.S. PATENT DOCUMENTS

| 5,241,284 | 8/1993 | Nvqvist et al. ...................... 330/297 |
| 5,291,542 | 3/1994 | Kivari et al. ............................ 379/58 |
| 5,301,359 | 4/1994 | Van den Heuvel et al. ....... 455/56.1 |
| 5,301,360 | * 4/1994 | Goldberg ............................. 455/67.4 |
| 5,378,935 | 1/1995 | Korhonen et al. ................... 327/114 |
| 5,416,435 | 5/1995 | Jokinen et al. ....................... 327/113 |
| 5,471,655 | 11/1995 | Kivari ................................... 455/127 |
| 5,491,718 | 2/1996 | Gould et al. .......................... 375/205 |
| 5,570,369 | 10/1996 | Jokinen ................................ 370/95.3 |
| 5,581,244 | 12/1996 | Jokimies et al. ................. 340/825.44 |
| 5,596,571 | 1/1997 | Gould et al. .......................... 370/335 |
| 5,613,235 | 3/1997 | Kivari et al. .......................... 455/343 |
| 5,642,063 | 6/1997 | Lehikoinen ............................ 327/74 |
| 5,682,093 | 10/1997 | Kivela ................................... 323/273 |
| 5,717,319 | 2/1998 | Jokinen ................................. 323/280 |
| 5,732,360 | * 3/1998 | Jarett et al. ........................... 455/552 |
| 5,799,256 | * 8/1998 | Pombo et al. ......................... 455/574 |
| 5,999,811 | * 12/1999 | Molne .................................. 455/432 |

FOREIGN PATENT DOCUMENTS

| 2 250 892 | 6/1992 | (GB) . |
| 2 285 555 | 7/1995 | (GB) . |
| 2 289 191 | 11/1995 | (GB) . |
| 06311101 | 11/1994 | (JP) . |
| WO 94/24775 | 10/1994 | (WO) . |
| WO 98/27766 | 6/1998 | (WO) . |

OTHER PUBLICATIONS

GSM, ETS 300 523, paragraph 4.2.1.

* cited by examiner

Primary Examiner—Edward F. Urban
Assistant Examiner—Blane Jackson
(74) Attorney, Agent, or Firm—Perman & Green, LLP

(57) ABSTRACT

A dual or multi mode telephone can be connected to at least one cellular network or at least one cordless network. The telephone continuously monitors system information messages from said at least one cellular network and said at least one cordless network to maintain an idle mode connection. The telephone comprises first memory means for storing cell identification information about the cell in the cellular network concerned covering the telephone, and second memory means for storing cell identification information about the cells in the cellular network where the telephone has been covered by said at least one cordless network. The telephone furthermore comprises means for comparing the present cell identification information with the cell identification information stored in the second memory means, and means for enabling/disabling the cordless part of the telephone in dependence on said comparison.

10 Claims, 2 Drawing Sheets

INTELLIGENT NETWORK SEARCHING FOR A MULTI MODE PHONE

BACKGROUND OF THE INVENTION

The invention relates to a dual mode phone capable of establishing a connection to at least one cellular network or at least one cordless network, said phone continuously monitoring system information messages from said at least one cellular network and said at least one cordless network to maintain an idle mode connection.

Users demand long standby times, because they find it cumbersome to have to recharge their portable telephone more than a couple of times a week. The manufacturers have worked intensely on reducing the energy consumption which is of no use to the user. Portable cellular telephones have many advantages, as they offer great mobility, which also applies to data transmission, good speech quality and good data safety (which applies to digital systems in particular).

If the advantages of cellular networks are to be utilized in office environments and the like, this may take place e.g. via cordless systems, such as DECT. To avoid having to equip the staff with both a cordless telephone and a cellular telephone, it is attempted to integrate the two types in a so-called dual mode telephone, where the telephone in idle mode (ready to receive ingoing calls and to establish outgoing calls) continuously monitors the system information messages of the two networks. This requirement of continuous monitoring may have as a result that the telephone consumes energy in searching for a network, e.g. the DECT network, even though the telephone is outside the area covered by the network.

SUMMARY OF THE INVENTION

In accordance with this invention there is provided a method for use in network searching for a dual or multi mode telephone, capable of establishing a connection to at least one cellular network or at least one cordless network, said telephone monitoring system information messages from said at least one cellular network and/or said at least one cordless network to maintain an idle mode connection, said method comprising obtaining cell identification information about the cell in the cellular network concerned serving the telephone, comparing this cell identification information with cell identification information about the cells in the cellular network where the telephone is expected to be covered by said at least one cordless network, and enabling/disabling the cordless part of the telephone in dependence on said comparison.

The telephone is hereby capable of determining its own position on the basis of information from the cellular network and comparing this position with a geographical area usually covered by a cordless network. If the telephone is outside this area, the cordless part of the telephone is automatically disabled.

This disabling may be indicated to the user so that if he considers the disabling to be wrong, it can be manually overruled. The group of cellular cells providing cordless coverage can hereby be updated.

Thus, a dual or multi mode telephone capable of intelligently shutting down the paging activity when this serves no purpose is provided.

The invention also relates to a dual or multi mode telephone capable of establishing a connection to at least one cellular network or at least one cordless network, said telephone continuously monitoring system information messages from said at least one cellular network and said at least one cordless network to maintain an idle mode connection, said telephone comprising first memory means for storing cell identification information about the cell in the cellular network concerned covering the telephone, second memory means for storing cell identification information about the cells in the network where the telephone has previously been covered by said at least one cordless network, means for comparing the present cell identification information with the cell identification information stored in the second memory, and means for enabling/disabling the cordless part of the telephone in dependence on said comparison.

The invention also relates to a dual mode telephone having means for sensing a mechanical interconnection between the telephone and predetermined accessory parts for enabling/disabling the cordless part of the telephone in dependence on said sensing, thereby overruling the cell identification information based enabling/disabling of the cordless part of the telephone. The telephone can hereby detect when it is placed e.g. in a car kit. The DECT system, e.g., requires that the telephone be moved only slowly. If a DECT telephone is placed in a car which begins driving, the telephone will be cut off because of fading caused by multi path propagation.

BRIEF DESCRIPTION OF THE DRAWINGS

The invention will be explained more fully below in connection with preferred embodiments and with reference to the drawing, in which.

DETAILED DESCRIPTION OF THE INVENTION

The invention will be explained below in connection with a dual mode telephone (DMT) for GSM/DECT; these systems, separately and in combination, have been or are being standardized under ESTI. GSM is the cellular system ensuring almost complete geographical coverage in the countries in which the telecommunication companies offer this service. The DECT system is usually for in-house use, e.g. in a company whose staff can then call internally via the cordless network and externally via the switchboard of the company.

By using the information available from the GSM network it is possible to make a relative position determination of the DECT network in relation to the GSM network. The structure of cell identification information is determined by the GSM standard, and it comprises a mobile country code (MCC) identifying the country to which the network and thereby the cell belongs, a mobile network code (NC) identifying the network to which the cell belongs, a location area code (LAC) identifying an area in the network to which the cell belongs, and finally a cell identity (CI) identifying the cell within the area in the network to which it belongs. A base station system (BSS) or a network area is identified by an address in the form of a location area identification (LAI) comprising the address codes MCC, MNC and LAC. This address or identification code is unique to the network area which comprises a plurality of cells. Adding the cell identification code (CI) to the location area identification (LAI) gives a cell global identification (CGI) which is likewise unique to the cell. This structure is determined for GSM in ETS 300 523, paragraph 4.2.1. This information is transferred via the communication taking place between the portable terminal and the base station in the form of system information when the portable terminal is in idle mode.

Figure 1:
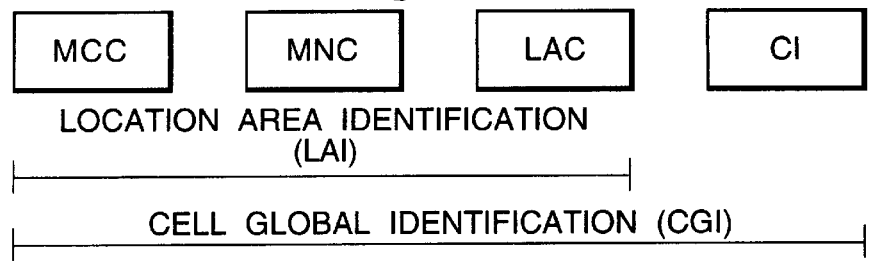
FIG. 1 schematically shows the structure of cell identification information according to the GSM standard, FIG. 2 schematically illustrates how cellular cells and cordless cells usually overlap each other.
Figure 2:
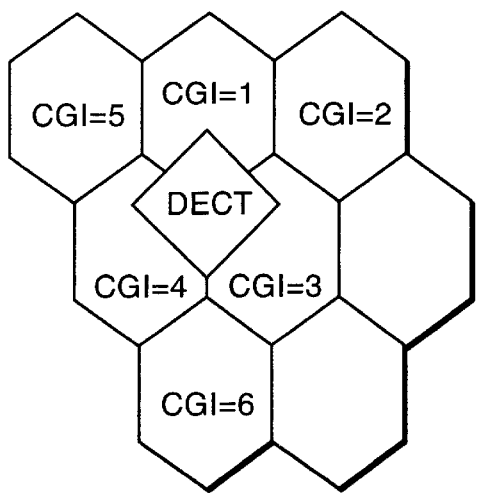

FIG. 2 shows schematically how the cells in the cellular network overlap each other. The GSM cells are shown to be hexagonal, but will have fluid borderlines in practice, as the network is designed to give satisfactory coverage to the greatest possible number of subscribers. This overlap between the GSM cells means that the portable terminal/telephone receives signals from several base stations at the same time. However, the terminal will camp on the cell from which it receives the best signal. The DECT cells will typically be defined within a building, as the DECT signals are rather vulnerable to fading caused by objects in motion.

The DECT cells are typically quite small in relation to the GSM cells. The distance between a GSM base station and a portable terminal must not exceed 32 km, since, otherwise, the signals received from a portable terminal cannot be synchronized with the signals from other portable terminals. What FIG. 2 shows is that the dual mode telephone can expect that there will be DECT coverage if it communicates with the base stations in the GSM cells with cell global identification (CGI)=1, 3 and 4. If, instead, the dual mode telephone communicates with base stations in other cells, it will in general be impossible to have DECT coverage from the DECT system concerned.

Table 1 shows an example of the relationship between DECT system coverage and the global cell information code, CGI, for the cells of the cellular GSM system, which also give coverage for the cellular part of the telephone. It will be seen that the dual mode telephone is assigned to four DECT networks, viz. one at the home of the telephone user (DECT home), one at his primary office (DECT office_1) which is close to the home, these two DECT networks being covered by the same GSM cell in some cases. Further, the telephone is assigned to a multi user DECT network at a shopping centre so that the user can make a call via this at the usual telephone rate. This network, too, has a partly coinciding GSM coverage with the two networks previously mentioned. Finally, the telephone is assigned to a DECT network at his secondary office (DECT office_2) which is located in another country and consequently has a CGI identification clearly different from the CGI identification of the three other networks, which differed only as regards the CI part.

TABLE 1

| n | cordless network | GSM address | | | |
|---|---|---|---|---|---|
| | | MCC | MNC | LAC | CI |
| 1 | DECT office_1 | 244 | 91 | 03b6 | 19.21 |
| 2 | DECT office_2 | 245 | 35 | 12d0 | 11 |
| 3 | DECT home | 244 | 91 | 03b6 | 21.22 |
| 4 | DECT shopping center | 244 | 91 | 03b6 | 20.21 |

In order to communicate with a DECT network, the telephone must be assigned to the network and be given an ID code.

Figure 3:
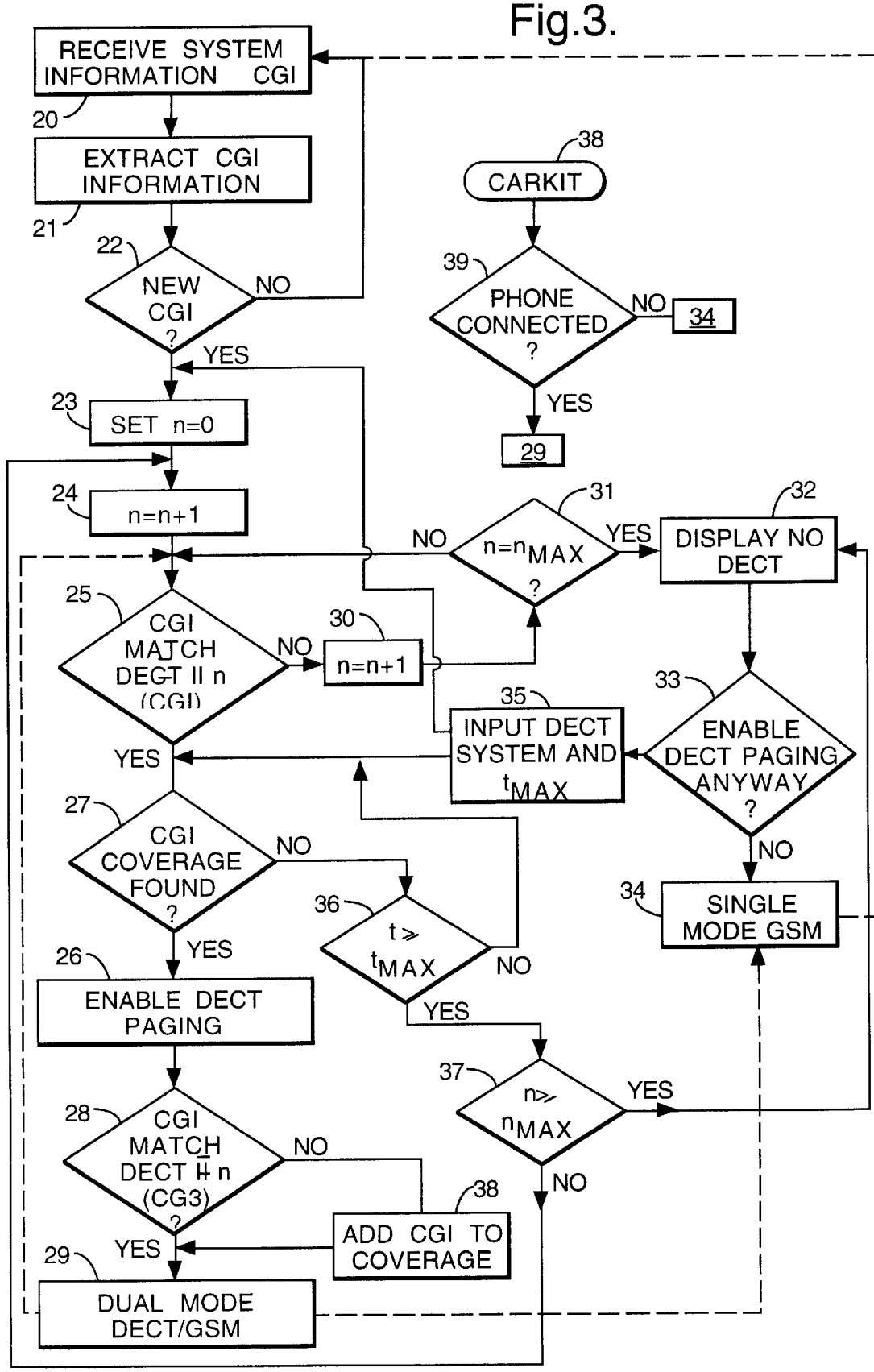
FIG. 3 shows a flow diagram to search for DECT coverage in a preferred embodiment of the invention.

A flow diagram illustrating the method of the invention is shown in FIG. 3. When the dual mode telephone searches for coverage from a predetermined DECT network in order to be able to switch to idle mode in DECT, it will already be in GSM idle mode, whereby it will receive GSM messages, which takes place in stage 20. The controller of the telephone detects the CGI part of the message, which takes place in stage 21. It is checked in stage 22 whether the telephone has arrived at a new GSM cell or not. If this is not the case, the controller jumps back to search for the next CGI information. If the telephone has arrived at a new cell, a search for DECT coverage is started if CGI matches. Since the telephone may be connected to several different DECT networks, a counter is set at the value 0 in stage 23. The contents of the counter are counted one up in stage 24, and then the controller checks in stage 25 whether the GSM cell concerned is comprised by the group of cells which have so far provided DECT coverage for the DECT network which is searched for. This is done by comparing the cell information of the cell concerned with the cell information of the cell group.

Stage 25 forms part of a scanning loop which successively scans for DECT networks which provide DECT coverage in the GSM cell concerned. This is done by checking whether CGI for the GSM cell concerned matches the GSM cell identification of the DECT network shown in table 1. If this is not the case, the next DECT network is checked, which is done by counting n one up in stage 30. As long as no DECT coverage is found, this is continued until all networks have been checked, which is detected in stage 31, in which n is compared with $n_{max}$, which is 4 in the case shown in connection with table 1.

If no matching between the CGI identification and the possible DECT networks is detected, the controller jumps to stage 32, where it is indicated to the user that it is not possible to obtain DECT coverage. This indication may be in the form of a sound signal (beep) combined with representation on a display. Then, in stage 33 the user has the opportunity of deciding whether the telephone is to go on with its search or not. As a default facility, the telephone may switch to pure single mode, which means GSM alone. This is done in stage 34, and the telephone remains in this mode until the user decides to start a new search for DECT coverage, or the telephone itself initiates a new search because of the arrival at a new GSM cell. However, it will frequently be advantageous to use a timer to search for DECT coverage at intervals of e.g. 10 minutes and to check whether the GSM cell matches the stored CGI information for the DECT system—which should be done for a period of 30 to 60 minutes as default. In a preferred embodiment, the telephone selects this mode automatically if the user has not decided to go on with his search within a predetermined period of time.

If in stage 33 the user wants the telephone to continue searching for DECT coverage, he is to state in stage 35 whether all accessible systems are still be scanned, or whether a specific DECT network is to be searched for. Further, the user must state whether he wants a search until coverage is found or a search of fixed duration. Default will usually be a search for all systems for a period of time. Depending on the selection, the controller goes to stage 23 to scan, or to stage 27 to search for a specific DECT network.

It is checked in stage 27 whether DECT coverage can be found, and if this is the case, the controller enables the DECT paging part of the telephone, which takes place in stage 26, thereby entering the DECT idle mode, which takes place in stage 29. The telephone will hereby be a dual mode telephone proper. However, prior to this, it has been checked in stage 28 whether the cell information is consistent with the cell information list of the group of cells which have so far given DECT coverage for the DECT network which is searched for. If this is not the case, the cell information list is updated, which takes place in stage 38.

It was checked in stage 27 whether DECT coverage could be found, and if this is not the case, the search for the DECT system is repeated a number of times within a period $t_{max}$, which may e.g. be of a duration of some minutes, as default. It is checked in stage 36 whether the time spent on the search exceeds $t_{max}$, and the search is continued as long as this is not the case. If $t_{max}$ is exceeded, the controller concludes that the DECT network concerned provides no coverage at the location concerned, and checks in stage 37 whether there are still networks to which the telephone is assigned, and whose coverage has not been checked. If this is the case, the controller jumps back to stage 24, where a search for the next DECT network is initiated in that the value "n" is counted one up, and then coverage for this DECT network is searched for. If the telephone is designed to search for a DECT network for e.g. up to 30 minutes before giving up, the loop may advantageously be designed to scan for the DECT networks, to pause, and to scan again. If CI is 21, the search for the DECT systems in table 1 will proceed as follows: 1, 3, 4, pause, 1, 3, 4, pause, and so on until $t_{max}$ is reached or DECT coverage is obtained.

If it was established in stage 37 that a search had been conducted for all the DECT networks to which the telephone was assigned, the controller jumps to stage 32.

The DECT system is not suitable for terminals moving at a high speed. Therefore, the dual mode telephone of the invention is adapted to detect when it is placed in e.g. a car kit. This detection takes place in stage 38, and it is already used today for volume control by the hands free function.

If a change in status is detected, it is checked in stage 39 whether the telephone was placed in the car kit or removed from it. If the telephone was placed in the car kit (connected), the telephone switches to GSM single mode (stage 34). Assuming that the telephone was in dual mode, the switch from the dual mode function in stage 29 to the single mode function in stage 34 is shown in dashed line. Even if the telephone was in search mode, it will switch to single mode in stage 34.

If, on the other hand, the telephone was removed from the car kit (disconnected), it switches from GSM single mode (stage 34) to search mode in stage 23, which is shown in dashed line.

If the DECT coverage in stage 29 is lost without a change in CGI and without the telephone being placed in the car kit, the telephone will automatically try to re-establish the DECT coverage (with the same DECT system) by jumping back to stage 25, which is indicated in dashed line.

When the telephone operates in dual idle mode (stage 29) and a change in CGI occurs (because of roaming in the GSM system), the telephone remains in the dual mode state (stage 29), but will register the new CGI.

The invention has been explained above in connection with a GSM/DECT dual mode telephone, but it may be used in all types of dual mode or multi mode telephones, where a search for network coverage may be automatically prevented on the basis of the knowledge of the position of the telephone, if it is already clear that this search will be in vain.

Figure 4:
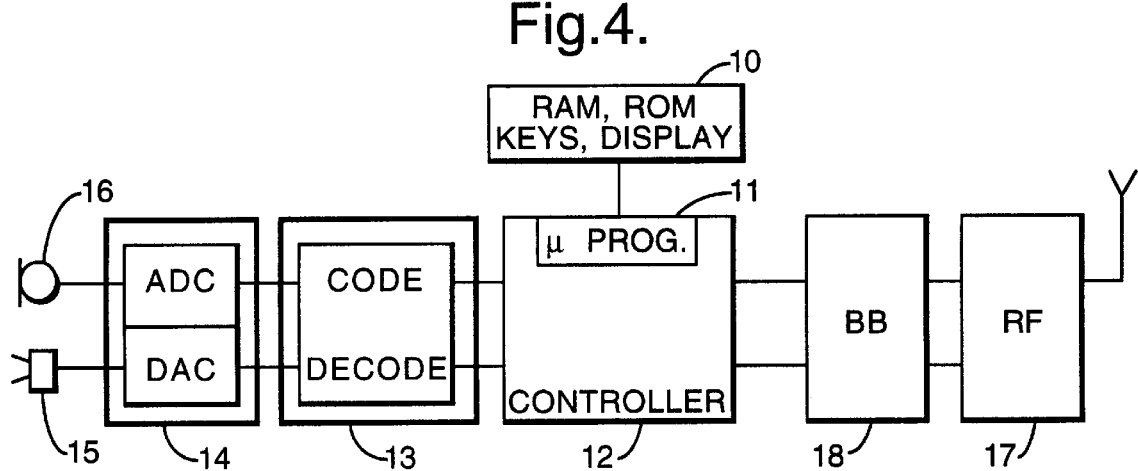
FIG. 4 schematically shows the structure of a dual mode telephone according to a preferred embodiment of the invention.

FIG. 4 moreover shows the most important parts of a preferred embodiment of a dual mode telephone, said parts being essential to the understanding of the invention. A controller 12 is provided with a microprocessor 11. A microphone 16 records the user's speech, and the resulting analog signals are A/D-converted in an ADC in a converter unit 14 before it is speech-encoded in a code/encode unit 13. The encoded speech signal is transferred to the physical layer processor 11, which e.g. supports the DECT/GSM terminal software.

The processor 11 also constitutes the interface to the peripheral units 10 of the apparatus, including the display and the keypad (as well as SIM, data, power supply, RAM, ROM, etc.) The processor 11 communicates with the RF part 17 via a baseband unit 18. In addition to transmitting data, packed in accordance with the standard concerned, to the RF part, the controller also controls the oscillator frequency so that the packet concerned is transmitted at the correct transmission frequency. The reception is controlled correspondingly.

The baseband unit 18 is a baseband converter, which moreover performs a channel equalizer function. The audio code/encode unit 13 speech-decodes the signal which is transferred from the controller 12 to the earpiece 15 via a DAC in the converter unit 14. Thus, it is the controller 12 which controls the communication in the telephone and messages in idle mode. Thus, it is also the controller 12 which carries out the method of the invention. In the preferred embodiment, the method is implemented as software which is executed under the control of the controller 12.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A method for searching for a cordless network in a dual or multi mode phone, capable of establishing a connection to at least one cellular network and to at least one cordless network, said method comprising:

maintaining an idle mode connection with one of said at least one cellular network;

monitoring system information messages from said at least one cellular network in order to obtain cell identification information about the cell in the cellular network presently serving the phone;

comparing the cell identification information of the monitoring step with cell identification information pre-stored in the phone identifying the cells in the cellular network in which the phone is expected to be covered by said at least one cordless network; and initiating searching for the cordless network subsequent to an indication of said comparison that coverage of said cordless network could be present.

2. A method according to claim 1, wherein the cordless network is selected as being the preferred network.

3. A method according to claim 1, wherein the cell identification information stored in the phone identifying the cells in the cellular network in which the phone is expected to be covered by said at least one cordless network is up-dated when said at least one cordless network is searched manually by the phone and detected.

4. A dual or multi mode telephone capable of establishing a connection to at least one cellular network and to at least one cordless network, said telephone comprising:

means for maintaining an idle mode connection with one of said at least one cellular network;

means for monitoring system information messages from said at least one cellular network in order to obtain present cell identification information about the cell in the cellular network presently serving the phone;

memory means for pre-stored cell identification information identifying the cells in the cellular network in which the phone is expected to be covered by said at least one cordless network;

means for comparing the present cell identification information with the cell identification information pre-stored in the memory; and means for searching for the cordless network when said comparison indicates that coverage of said cordless network could be present.

5. A dual or multi mode telephone according to claim 4, connected to a GSM network as a cellular network from which it receives cell global identification (CGI) as cell identification information about a cell via paging messages.

6. A dual or multi mode telephone according to claim 4, connected to one or more DECT networks as said at least one cordless network, said memory means containing cell identification information about the cells in the cellular network where the telephone has been covered by a DECT network, and an associated identification of the DECT network which has coverage in the cell concerned in the cellular network.

7. A dual or multi mode telephone according to claim 4, wherein the telephone has means for manually enabling/disabling a cordless part of the telephone, thereby overruling an enabling/disabling of the cordless part of the telephone based on the cell identification information.

8. A dual or multi mode telephone according to claim 4, wherein the telephone has means for sensing a mechanical interconnection between the telephone and predetermined accessory parts for enabling/disabling a cordless part of the telephone in dependence on said sensing, thereby overruling an enabling/disabling of the cordless part of the telephone based on the cell identification information.

9. A dual or multi mode telephone according to claim 8, wherein said means for sensing a mechanical interconnection between the telephone and predetermined accessory is adapted to detect the placing of the telephone in a car kit.

10. A dual or multi mode telephone according to claim 4, further comprising:

means for sensing a mechanical interconnection between the telephone and a car kit for detecting when the telephone is placed in a car kit; and means for disabling a searching for the cordless network when the phone is detected to be placed in said car kit independently of said cell identification information.

* * * * *